April 28, 1925.

F. G. B. RÖDEL

SCREW GEARING

Filed Sept. 5, 1924

Patented Apr. 28, 1925.

1,535,135

UNITED STATES PATENT OFFICE.

FRIEDRICH GUSTAV BERNHARD RÖDEL, OF LEIPZIG, GERMANY.

SCREW GEARING.

Application filed September 5, 1924. Serial No. 736,126.

*To all whom it may concern:*

Be it known that I, FRIEDRICH G. B. RÖDEL, a citizen of the German Republic, residing at Oetzscherweg 6, Leipzig, Germany, have invented new and useful Improvements Relating to Screw Gearing, of which the following is a full, clear, concise, and exact description, reference being had to the accompanying drawing, forming a part of this specification.

My invention relates to screw gearing and it has particular relation to the provision of improved means for utilizing ball bearings in the lead spindles of lathes and in analogous situations.

My experience is that ball bearings have not been heretofore employed in the locks for the nuts of lead spindles and this despite the fact that in such spindles and nuts there is a very rapid wear in the threads whereby the work performed on such machines, especially when cutting screw threads, gradually becomes more and more inaccurate. It would seem desirable to reduce the wear in the spindle and nut by introducing ball bearings between the threads of said spindle and nut. This latter, however, has not been accomplished so far as I am aware, since upon disconnecting the lock of the lead spindle nut and further upon the moving apart of the upper and lower halves of said nut, the balls mounted in the upper half fall out.

In the construction which I hereafter describe, the problem has been solved in that it is possible, in such construction, to utilize hardened spindles, hardened nut threads, and hardened balls as will hereafter be described. These balls are retained in the threads of the upper and lower halves of the nut by means of a novel retaining band which is so fitted in the halves of the nut that the balls are prevented from falling out. It has, of course, been necessary to evolve an entirely new ball-retaining means, since the ball cages having cylindrical surfaces are not capable of properly retaining the bearing balls in position in screw-threaded and divided nuts of screw gears.

Figure 1:
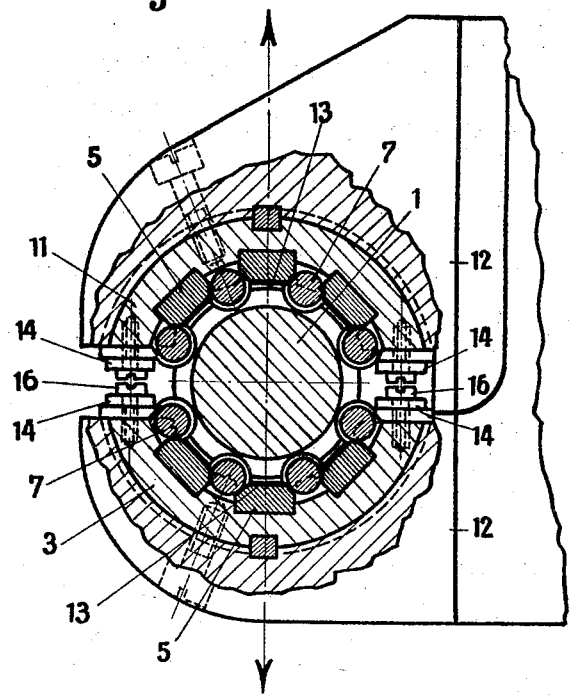
Figure 2:
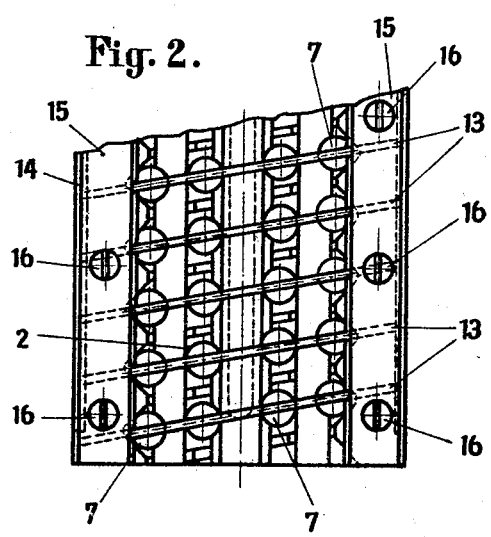

In connection with my invention, Fig. 1 thereof is a vertical view, partially in section, through the lock of a lead spindle nut, the well-known lock portions for moving the two halves of the nuts towards one another being omitted; and Fig. 2 is a plan view of the lower half of the lock nut.

In the drawings, a lead spindle 1 is provided with threads 2. A lock nut comprises a lower half 3 and an upper half 11, the said halves of the nut being composed of hardened steel and being secured in a lock 12. Hardened wedges 5 are axially inserted between bearing balls 7, which latter are arranged to furnish the bearing surfaces between the screw gearing spindle in the aforesaid bearing comprising the halves 3 and 11.

As hereafter pointed out, it is essential that the balls be retained in position so that they will not fall out upon the separation and moving apart of the two halves of the lock nut. I accomplish this by providing ball-retaining bands 13 of a novel form, which, it will be observed, are fitted into the path of the balls 7 in a helical manner whereby the said balls are prevented from falling out. The aforesaid bands 13 are preferably composed of steel and are secured at their ends, by means of longitudinally extending members 14, to the surface 15 of the lock nut, the screws 16 being employed to secure the band as shown.

As will be noted from the drawings, these bands are of such character that they pass over the balls and down between the same into contact with the wedges 5. In other words, the bands 13 pass over the surface of the balls while between each two balls they (the bands) engage with the flat surface of the wedges 5.

From the foregoing description, it will be apparent that I have provided means which may be utilized in connection with a lead spindle for screw gearing or in other analogous situations whereby ball bearings can be advantageously employed and yet wherein said ball bearings are properly retained in position upon the separation of the lock nut surrounding the spindle and providing the bearing therefor.

While I have shown but one embodiment of my invention, it is apparent that many modifications therein may occur to those skilled in the art, and I desire, therefore, that my invention be limited only by the prior art and the scope of the appended claims.

Having thus described my invention, what I claim as new and desire to secure by Letters Patent of the U. S. is:—

1. In a ball bearing for lead spindles and the like, a threaded spindle, a bearing member surrounding the same, ball bearings associated with the threads of said spindle, retaining members disposed axially of said spindle and retaining said balls, and securing means extending interiorly of said bearing member and over said balls.

2. In a ball bearing for lead spindles and the like, a threaded spindle member, bearing balls associated with said threads, a lock member surrounding said spindle, axially disposed means for retaining said balls, and ball-retaining bands extending over said balls and secured to said bearing.

3. In a ball bearing for spindles and the like, a threaded spindle, a divided lock nut therefor, bearing balls associated with the threads of said spindle, and bearing bands extending parallel to the threads of the spindle and over the surface of the balls, said bands being indented between each two balls whereby the latter are secured firmly in place.

4. In a ball bearing for lead spindles and the like, a threaded lead spindle, a divided lock nut surrounding the same, bearing balls associated with the threads of said spindle, axially extending wedges serving to secure said balls, and bearing bands secured at their outer ends to the upper and lower halves of said lock nuts, said bands being arranged parallel to the threads of said nut and along the surface of the balls seated in the threads of the spindle, and between each two balls being substantially in contact with the flat surfaces of said wedges.

In witness whereof, I have hereunto subscribed my name.

FRIEDRICH GUSTAV BERNHARD RÖDEL.

Witnesses:
RUDOLPH FRICKE,
WILLY STIER.